(12) United States Patent
Sheehy et al.

(10) Patent No.: US 12,249,477 B2
(45) Date of Patent: *Mar. 11, 2025

(54) LARGE SCALE STABLE FIELD EMITTER FOR HIGH CURRENT APPLICATIONS

(71) Applicant: MICRO-X LIMITED, Tonsley (AU)

(72) Inventors: Robert C. Sheehy, Tonsley (AU); Brian Gonzales, Tonsley (AU); Peter Yaron, Tonsley (AU); Anthony Skeats, Tonsley (AU); Steven Trewartha, Tonsley (AU); Susanne Sahlos, Tonsley (AU); Gandalf Du Preez, Tonsley (AU)

(73) Assignee: MICRO-X Limited, Tonsley (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,938

(22) Filed: Apr. 1, 2024

(65) Prior Publication Data
US 2024/0266136 A1 Aug. 8, 2024

Related U.S. Application Data

(63) Continuation of application No. 17/045,463, filed as application No. PCT/AU2019/000042 on Apr. 4, 2019, now Pat. No. 11,955,306.

(30) Foreign Application Priority Data

Apr. 6, 2018 (AU) .................................. 2018901153

(51) Int. Cl.
*H01J 35/06* (2006.01)
*B82Y 15/00* (2011.01)
*B82Y 40/00* (2011.01)
*C01B 32/158* (2017.01)
*H01J 9/02* (2006.01)

(52) U.S. Cl.
CPC .......... *H01J 35/065* (2013.01); *C01B 32/158* (2017.08); *H01J 9/025* (2013.01); *B82Y 15/00* (2013.01); *B82Y 40/00* (2013.01); *H01J 2201/30469* (2013.01)

(58) Field of Classification Search
CPC ..... H01J 1/304–3046; H01J 9/022–027; H01J 35/064
See application file for complete search history.

(56) References Cited

U.S. PATENT DOCUMENTS 6,277,318 B1 8/2001 Bower et al.
6,553,096 B1 4/2003 Zhou et al.
(Continued)

FOREIGN PATENT DOCUMENTS

DE  10 2014 226 048 A1  9/2015
WO  2015/118177 A1  8/2015

*Primary Examiner* — Mariceli Santiago
(74) *Attorney, Agent, or Firm* — Seed IP Law Group LLP (57) ABSTRACT

The present invention relates to large area field emission devices based on the incorporation of macroscopic, microscopic, and nanoscopic field enhancement features and a designed forced current sharing matrix layer to enable a stable high-current density long-life field emission device. The present invention pertains to a wide range of field emission sources and is not limited to a specific field emission technology. The invention is described as an X-ray electron source but can be applied to any application requiring a high current density electron source.

20 Claims, 6 Drawing Sheets

(56) References Cited

U.S. PATENT DOCUMENTS

| | | |
|---|---|---|
| 6,630,772 B1 | 10/2003 | Bower et al. |
| 6,787,122 B2 | 9/2004 | Zhou |
| 6,850,595 B2 | 2/2005 | Zhou et al. |
| 6,876,724 B2 | 4/2005 | Zhou et al. |
| 6,965,199 B2 | 11/2005 | Stoner et al. |
| 6,969,690 B2 | 11/2005 | Zhou et al. |
| 6,980,627 B2 | 12/2005 | Qiu et al. |
| 7,085,351 B2 | 8/2006 | Lu et al. |
| 7,252,749 B2 | 8/2007 | Zhou et al. |
| 7,294,248 B2 | 11/2007 | Gao |
| 7,359,484 B2 | 4/2008 | Qiu et al. |
| 7,455,757 B2 | 11/2008 | Oh et al. |
| 7,618,300 B2 | 11/2009 | Liu et al. |
| 7,751,528 B2 | 7/2010 | Zhou et al. |
| 7,850,874 B2 | 12/2010 | Lu et al. |
| 8,002,958 B2 | 8/2011 | Zhou et al. |
| 8,447,013 B2 | 5/2013 | Sprenger et al. |
| 8,842,806 B2 | 9/2014 | Packard et al. |
| 9,552,955 B2 | 1/2017 | Beckmann et al. |
| 11,955,306 B2 * | 4/2024 | Sheehy ................ H01J 1/3048 |
| 2006/0214550 A1 | 9/2006 | Lee |
| 2008/0030152 A1 | 2/2008 | Komatsu et al. |
| 2009/0039754 A1 | 2/2009 | Tolt |
| 2014/0321619 A1 | 10/2014 | Dokania et al. |
| 2014/0353397 A1 | 12/2014 | Velásquez-Garcia et al. |
| 2015/0035428 A1 | 2/2015 | Sun et al. |
| 2022/0020554 A1 | 1/2022 | Shinkawa et al. |

\* cited by examiner

LARGE SCALE STABLE FIELD EMITTER FOR HIGH CURRENT APPLICATIONS

PRIORITY DOCUMENTS

The present application claims priority from Australian Provisional Patent Application No. 2018901153 titled "LARGE SCALE STABLE FIELD EMITTER FOR HIGH CURRENT APPLICATIONS" and filed on 6 Apr. 2018, the content of which is hereby incorporated by reference in its entirety.

TECHNICAL FIELD

The present disclosure relates to field emission devices. In a particular form the present disclosure relates to large scale stable field emitters for high current applications and methods of manufacture.

BACKGROUND

Nanostructured field emission devices have been well documented and have been extensively researched for over 60 years. These nanostructured field emission devices are defined as individual single point electron emission sources and include, at a minimum, carbon nanotubes (CNTs), carbon nanowires, tungsten nanowires, silicon pillars, silicon pyramids, and nanostructured diamond. The research demonstrates that the current density of these devices is related to the field enhancement derived from the nanostructure of the device and the conductive properties of the device. The theoretical and practical electron current densities of individual (i.e. isolated) field emission devices are well documented; the capability and limitations of the individual emitters are well understood and mathematically modelled for many of the materials. Optimization of new and improved individual nanostructured field emission devices continues to be an active area of research.

Nanostructured electron emission devices rely on quantum electron tunnelling to deliver an electron current and these devices are typically grown in plasmas. Due to their size, emission physics, and fabrication process, each individual device is inherently unique. The specific emission properties of any device will have some intrinsic variability due to this uniqueness. Therefore, the emission model of any nanostructured electron emitter is a probability distribution based on the general properties of the device. In a large distribution of individual emitters, each emitter will perform differently, and this will result in some emitters being more stressed and others not fully or partially contributing electron current. A stable large area emitter requires all emitters to be participating within a narrow range of each other. As the area of the emitter increases, the variation between individual emitters becomes more apparent.

Individual nanostructured field emission devices fail to deliver sufficient current for many potential applications that require a high current electron source. Thus, to increase the total (macroscopic) electron current, multiple individual nanostructured field emission devices are used together as a common electron current source. Research into nanostructured field emission devices has almost exclusively focused on the individual devices to improve current density of the individual devices. The literature, to date, has described methods for creating electron current sources based on multiple individual field emission devices by extending the properties of the individual emitters to a wider distribution of emitters. The existing literature has described the degradation of: field enhancement, current density per unit area, uniformity of emitters, mechanical bonding of emitters, and thermal limitations of emitters; all in the context of individual field emission devices. The literature teaches that optimizing the individual field emission devices, and replicating this optimization as narrowly as possible, is the key to generating a stable high current source.

Nanostructured field emission device literature has consistently predicted the widespread use of field emission devices as electron current sources based on extending the principles of individual devices to a distribution of devices. That is, research has focused on optimising an individual field emission device and then attempting to distribute these over a wider area. However large scale, nanostructured field emission devices have so far failed to achieve the predicted success. Attempts to design large area electron emitters capable of delivering larger electron currents have mostly failed to repeatedly deliver stable, even electron emission over the entire emitter for long periods of operation. The limited successful cases have struggled to repeat the success as the size of the emitter increased and have consequently failed to produce sufficient electron current for the targeted applications.

To date, only a single type of large-scale field emission device has demonstrated the delivery of a stable, even electron emission over a large area electron emitter. For example, U.S. Pat. No. 6,277,318 describes a method for fabricating devices by depositing carbon nanotubes with a high length to aspect ratio onto a substrate. U.S. Pat. No. 6,553,096 describes a carbon nanotube (CNT) field emitter for generating X-Rays using these devices. This has relied on the use of a single nanostructured device, carbon nanotubes, optimally bonded to an electrode and semi-optimally distributed to ensure even field enhancement over the distribution of carbon nanotubes. This narrowly defined method and device has been the subject of a broad range of academic journal articles and patents, describing the use of such an electron emitter in a range of applications, including x-ray tubes and flat panel displays. Although published broadly, this method and device has been shown to only work when a single combination of carbon nanotubes, electrode, and bonding matrix is used. The justification of this single combination is not described in the literature; apart from the bonding properties of the matrix and the purity of the carbon nanotubes. These researchers have also focused on methods to improve the uniformity of CNTs, or ways to improve the uniformity of the deposition, such as by aligning at least 50% of the CNTs in the same direction, for example by applying an electric field as is described in U.S. Pat. No. 6,630,772. However, despite extensive research, it has not been possible to substantially improve upon the initial performance of these devices, or to construct working devices from other materials.

There is thus a need to provide a method for manufacturing large scale stable field emitters for high current applications, and actual large-scale stable field emitters, or at least provide a useful alternative to current methods and field emission devices.

SUMMARY

The current disclosure relates to a method for creating large area, stable electron emitters for high current (i.e. >1 mA) applications based on the optimization of a large distribution of individual field emission devices, and the associated field emission devices. Notably the method is independent of any specific version of nanostructured field emission devices (i.e. is not just limited to carbon nanotubes). In one embodiment a method for manufacturing a field emission electron source device comprises:

forming a current sharing matrix layer electrically connected to a substrate, wherein the current sharing matrix is either bonded to the substrate, deposited on the substrate, formed directly on the substrate, or formed directly in the substrate;

forming an emitter surface comprised of a plurality of nanoscale field emitters electrically connected to the matrix sharing layer, wherein the emission surface is formed by either obtaining a plurality of nanoscale field emitters and bonding to the current sharing matrix layer or forming the plurality of nanoscale field emitters directly on the current sharing matrix layer.

The current sharing matrix incorporates a plurality of series resistive pathways between the plurality of individual nanoscale field emitters and the substrate to force current sharing among the plurality of individual nanoscale field emitters. Further the plurality of individual nanoscale field emitters, matrix material, substrate, are configured to form a plurality of structures such that the structures form electric field enhancement features at a plurality of scales from a macroscopic scale down to the nanoscopic scale wherein the structures are fractal, geometrically repeating (e.g. designed or deliberately formed), and/or randomly distributed. This optimizes the field enhancement over the entire large area of the emitter surface instead of optimizing a single field emission device. Further the current sharing matrix creates a passive resistance sharing network and is composed of a material or combination of materials with sufficient electrical resistance to force current sharing between the nanostructured field emission devices. This prevents overstressing a subset of field emission devices and ensure stable current across the entire emitter surface.

Additionally, sharing resistance allows current extraction of individual emitters up to the safe operational limit to be more closely matched. Without sharing the derating of the average individual emitter operating current needs to be much harsher to allow for the wide spread of operating currents (due to inherent variability of the devices) and is determined by the emitter that has the strongest emission hitting the safe operating limit first. The method and associated devices allows a broader range of devices to be used within the same structure. This translates into higher repeatability and makes it easier to manufacture and to scale up to larger areas and contributes to devices with a long life.

Similarly, in one embodiment, a field emission electron source device is provided, the device comprising:

an electrode integrated into a substrate or an electrode bonded to a substrate;

an emitter surface comprised of a plurality of individual nanoscale field emitters;

a current sharing matrix layer matrix material located between the plurality of individual nanoscale field emitters and the substrate or incorporated into the substrate.

In this device the current sharing matrix layer comprises a plurality of series resistive pathways between the plurality of individual nanoscale field emitters and the electrode to force current sharing among the plurality of individual nanoscale field emitters, and the plurality of individual nanoscale field emitters, current sharing matrix material, and substrate, are configured to form a plurality of structures such that the structures form electric field enhancement features at a plurality of scales from a macroscopic scale down to the nanoscopic scale wherein the structures are fractal, geometrically repeating, and/or randomly distributed. In use, the field emission electron source device emits electrons with a spatially even distribution across an emitter region of the emitter surface having an area of at least one square millimeter and delivers stable electron emission with a current density greater or equal to one milliampere per square millimeter.

In one or more embodiments of the method or device, the plurality of structures comprises macroscopic scale structures having a size between 100 μm and 10 mm and are created by treating, forming, or constructing the current sharing matrix material, and/or the substrate to comprise structures comprising repeating geometric shape patterns of field emission.

In one or more embodiments of the method or device, the plurality of structures comprises microscopic scale features created through surface treatment of the current sharing matrix layer and/or substrate to create a three-dimensional surface of fractal or random structures in the few to tens of microns size.

In one or more embodiments of the method or device, the plurality of structures comprises microscopic scale features and the microscopic features comprise matrix material and/or substrate formed to have a three-dimensional surface of fractal or random structures in the one to tens of microns size.

In one or more embodiments of the method or device, the plurality of structures comprises microscopic scale features and the method further comprises creating microscopic scale features by patterning the placement of the plurality of individual nanoscale field emitters on the matrix material and substrate.

In one or more embodiments of the method or device, the plurality of structures comprises nanoscopic features that are either an inherent feature of the plurality of individual nanoscale field emitters or are created when bonding the plurality of individual nanoscale field emitters to the current sharing matrix material. In one form the nanoscopic features are created by using nanostructured material of a fractal nature. In a further form the nanostructured material includes high aspect ratio features.

In one or more embodiments of the method or device, each structure adds an incremental electric field enhancement.

In one or more embodiments of the method or device, the resistive pathways are formed using a highly resistive material. In one form the resistive pathways are formed using a semiconductor material with resistive properties. In one form the resistive pathways are formed using a cermet material with resistive properties.

In one or more embodiments of the method, the substrate is an electrode substrate and the method further comprises forming an electrical connection to the electrode substrate.

In one or more embodiments of the method or device, the method further comprises bonding an electrode to the substrate and forming an electrical connection to the electrode.

In one or more embodiments of the device, the current sharing matrix layer is formed of a matrix material electromechanically bonded to the plurality of individual nanoscale field emitters. In one form the current sharing matrix layer is formed of a matrix material electromechanically bonded to the substrate electrode. In one form the current sharing matrix layer is formed within the substrate and is bonded to the electrode.

In one or more embodiments the device further comprises a secondary electric field extraction electrode and control electronics for switching field emission on and off.

The field emission electron source devices can be integrated into a range of products and systems. In one embodiment an X-Ray field emission device is provided, comprising:

a cathode comprising one or more field emission electron source devices according to the embodiments described herein;
an electric field extraction electrode;
control electronics for switching the field emission one or more field emission electron source devices on and off;
an anode comprising a target material configured to generate X-Ray emissions when impacted by electrons generated by the one or more field emission electron source devices; and
a vacuum chamber comprising an window for allowing passage of the X-rays generated from the anode.

Embodiments will now be described in further detail by reference to the accompanying drawings. It is to be understood that the particularity of the drawings does not supersede the generality of the preceding description of the disclosure.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Embodiments of a method, and the underlying design principles, for creating large area electron emitters that deliver large, stable, even current based on nanostructured field emission devices is described herein. The method extends the prior art related to nanostructured field emission devices by focusing on large distributions of devices instead of optimising individual devices. The method accounts for, but is independent of, the specific field emission properties of the individual nanostructured field emission devices. This disclosure describes embodiments of a method to optimally distribute the individual nanostructured field emission devices based on total emitter stability and even current distribution instead of optimizing the individual device current densities. This disclosure further describes embodiments of a method to electrically link an electrode with the distribution of individual nanostructured field emission devices to ensure stable, even electron current over the entire distribution of emission devices.

Figure 1:
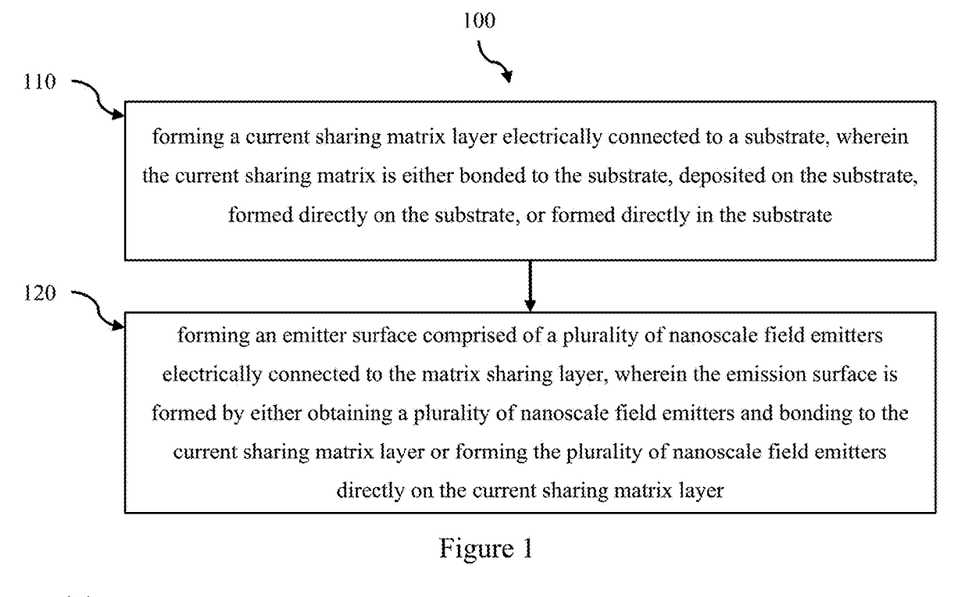
FIG. 1 is a flow chart of a method for manufacturing a field emission electron source device according to an embodiment.

FIG. 1 is a flow chart of a method 100 for manufacturing a field emission electron source device according to an embodiment. The method comprises the step 110 of forming a current sharing matrix layer electrically connected to a substrate, wherein the current sharing matrix is either bonded to the substrate, deposited on the substrate, formed directly on the substrate, or formed directly in the substrate. The method further comprises the step 120 of forming an emitter surface comprised of a plurality of nanoscale field emitters electrically connected to the matrix sharing layer, wherein the emission surface is formed by either obtaining a plurality of nanoscale field emitters and bonding to the current sharing matrix layer or forming the plurality of nanoscale field emitters directly on the current sharing matrix layer. Electrons are emitted by an emission region of the emission surface. This may be the whole emission surface or a smaller portion of the emission surface. For example the emission surface may be partitioned into multiple emission regions, or some of the surface may be obscured preventing emission (e.g. around the edges of the surface).

Embodiments of the method can address the problems created by the inherent variability of nanostructured field emission devices. The devices comprise a plurality of structures such that the structures form electric field enhancement features at a plurality of scales from a macroscopic scale down to the nanoscopic scale. These structures may be fractal, geometrically repeating (e.g. specifically designed or manufactured features with regular shapes and spacing) and/or randomly distributed (and to be clear, combinations of the three), and act to enhance the electric field at successively smaller levels to create regions of field enhancement enabling the participation of a wider range of individual field emission devices within the regions. The variability between the individual field emission devices is addressed by forcing current sharing among the devices via the current sharing matrix layer. This forced current sharing combats the natural tendency for the best devices to dominate the current contribution and burning themselves out early. The resistive pathways of the current sharing matrix and the plurality of structures of different scales work together to enable devices to be constructed that emit electrons with a spatially even distribution across an emitter region of the emitter surface having an area of at least one square millimeter and with a current density greater or equal to one milliampere per square millimeter.

Electric field strength can be defined based on a voltage potential difference between two electrodes. If the electrodes are perfectly parallel, the electric field forms a consistent potential gradient between the plates proportional to the distance between the plates and the voltage difference. Features on the plates forces the electric field gradient to concentrate around the features. As the feature becomes sharper, the concentration of the electric field increases. Field emission devices create electric field concentrations high enough to force electron emission via quantum tunneling; the field concentration threshold for electron emission via tunneling is called the Fermi level. Nanostructured field emission devices create small sharp features that have low Fermi levels; the low Fermi level enables stable electron emitters to be built from these nanostructured devices.

Conventional field emission research assumes that the nanostructured devices exist in an ideal equal potential electric field and that field enhancement only occurs due to the structure of the device. For example carbon nanotubes (CNTs) can be 200 nm to 20 microns in length with diameter of 0.4 nm to 100 nm and typically have a high aspect ratio (i.e. large length compared to width) that creates a very high field concentration for field emission. The only other electric field consideration is the degradation of the device's field enhancement due to proximity of neighboring devices and space charge accumulation. Field enhancement independent of the nanostructured devices, for example at the microscopic scale, is considered in the literature to degrade the performance of the individual devices. A field enhancement independent of the nanostructured devices creates regions of high intensity and regions of low intensity; only nanostructured devices in the high intensity regions, with sufficient field strength, will emit electrons. This uneven electric field intensity reduces the current density of the overall distribution of devices if the devices are distributed evenly across the entire region, as is typically suggested in the current literature.

The current field emission literature teaches that large current emitters should be constructed by optimizing the individual field emission devices and replicating those devices over a large area. In this configuration, the optimal large area emitter has an assumed uniform electric field at the emitter surface and the only field enhancement is derived from the specific nanostructured devices. This, in theory, enables all devices to contribute to the total current, thereby maximizing the total current density of the emitter.

However nanostructured devices have intrinsic variations; and thus in a uniform electric field, the electron emission will not be uniform across a large area of distributed devices. Currently, the only solution for this non-uniformity is to reduce the variation between individual nanostructured devices.

The theoretically optimal large area and high current nanostructured field emitters consists of a distribution of identical high current density devices spaced perfectly not to interfere with each other. If the spacing is too close, the individual devices become suboptimal because the field enhancement at each is degraded. If the spacing is too far, the total current per unit area decreases because fewer devices can be fit into the area. If the devices are not uniform, then it is impossible to achieve the optimal spacing between emitters. Nanostructured field emission devices' intrinsic variation makes it impossible to achieve the theoretically optimal distribution over a large area. As the variation between devices increases, the spacing can drive the emitter to become significantly suboptimal; the use of ideal spacing increases the stress on the individual high preforming devices and hot-spot instability occurs.

Field emission devices, and methods for manufacturing such devices described herein have been developed based on the realisation that rather than attempt to optimise the properties (i.e. current density) of individual field emitters and then tightly control the manufacture and placement, stable large scale emitter devices can be manufactured through forming electric field enhancement features of a range of scales—from the macroscale down to the microscale. Whilst this design is suboptimal in terms of the field emission from individual devices, distributing the field emitters across the surface and providing different scales of field enhancement, combined with a current sharing matrix layer enables optimization (or at least significant improvement) in the total current density of the emitter as a whole. The additional levels of field enhancement allows the activation of specific devices to be a function of the unique characteristics of the nanostructured device and the location of the device. By controlling the additional levels of field enhancement, the overall current density of the emitter is controlled, and the emitter is less susceptible to variations of the nanostructured devices. Additionally, if devices in the lowest field strength regions fail, emitters in slightly higher field enhancement levels can be activated to recover the lost current. In this fashion, multiple levels of redundancy and stability can be built into a single large area structure.

Figure 2:
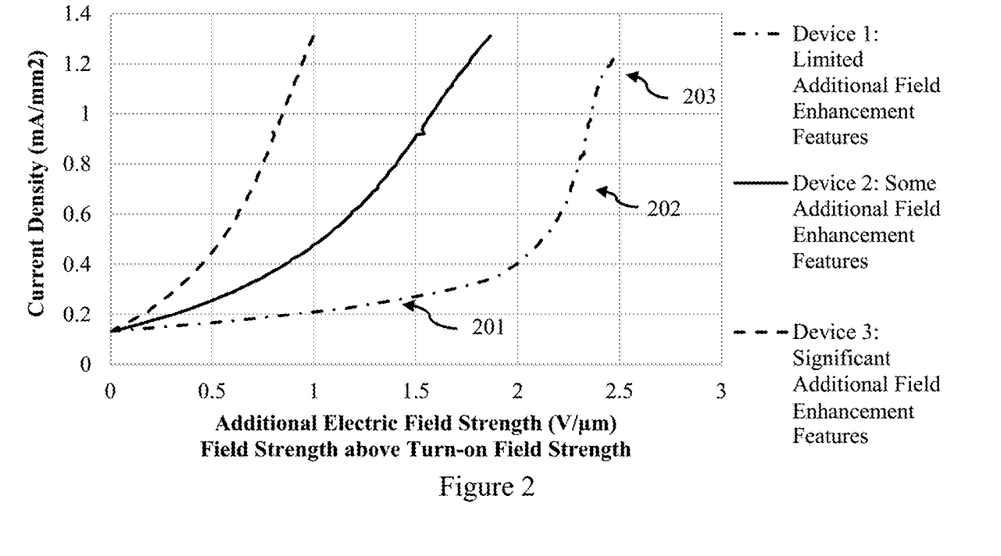
FIG. 2 is a plot of the emission device performance of three field emission devices according to an embodiment, all the same size, with different degrees of nanoscopic and microscopic field enhancement.

The advantage of increasing the levels of field enhancement is demonstrated in FIG. 2. In FIG. 2, the emitter performance of three different large area devices is compared; each of the devices has the same emission area. Device 1 has limited degree of additional field enhancement features in nanoscopic and microscopic scales. Device 2 has a moderate degree of additional field enhancement features in nanoscopic and microscopic scales. Device 3 has a significant degree additional field features enhancement in nanoscopic and microscopic scales. Each of the devices achieves the same peak current density at different field strengths relative to the turn on field strength. Each of the Devices has current density-field strength curves with two distinct slopes; in the first part of the slope 201, different regions across the emitter are turning on based on variations in the local field strengths and in the second part of the slope 202 the emitter is uniformly emitting across the entire device; all three devices reach this transition around 0.4 mA/mm$^2$. Device 1 requires the highest field strength to reach the point where all emitters are uniformly emitting because it has the limited additional field enhancement to reduce this threshold; this demonstrates the impact of the small variations in individual field emitters over a large area. Devices 1 and 2 show the beginning of a third change 203 in the slope at high current densities; this change in slope indicates that max current is being drawn from some of the emitters and the device is no longer uniform. Device 3 has not yet reached the max current density due to the fact that the additional field enhancement features increases the number of active field emitters over the large area.

Figure 3A:
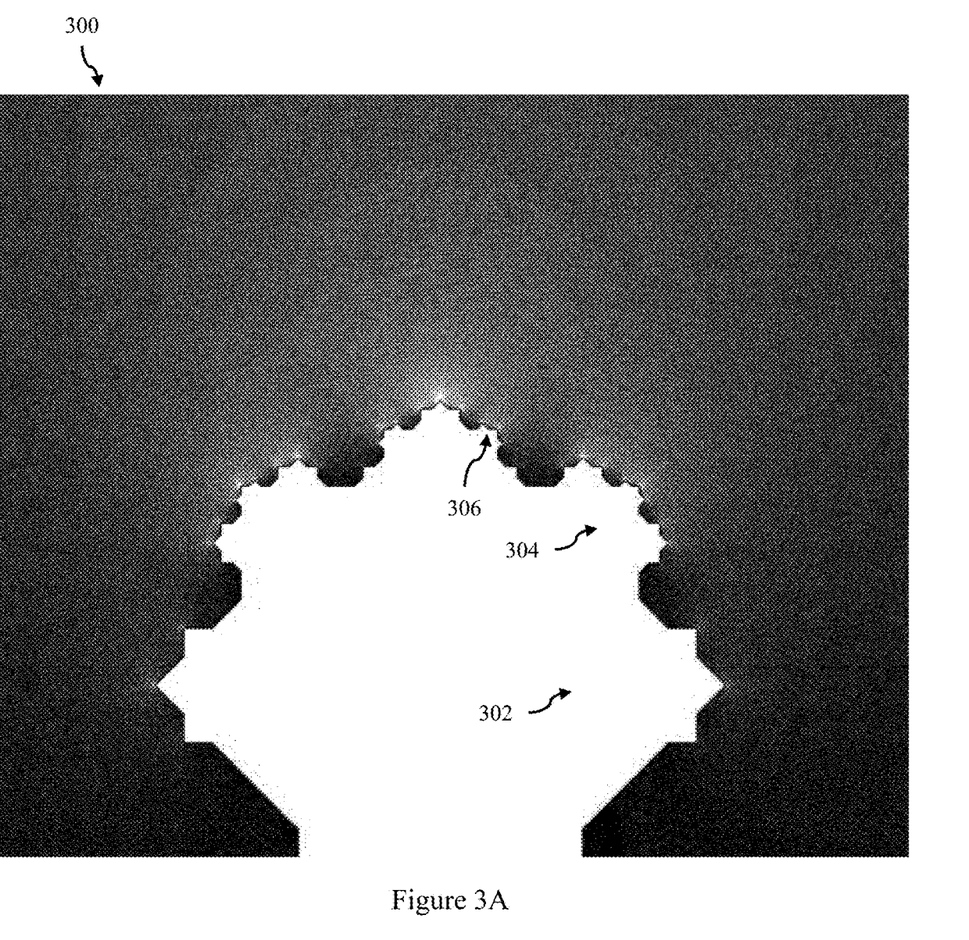
FIG. 3A is a schematic illustration of field emission enhancement by fractal geometry according to an embodiment.

The disclosed device is schematically illustrated in FIG. 3A which illustrates field emission enhancement by fractal geometry according to an embodiment. The electric field 300 is enhanced by multiple successive layers 302, 304, and 306, of geometric features. Each feature enhances a local electric field proportional to the size of the feature. FIG. 3A shows a device and the surrounding electric field density from a device with macroscopic features 302 with sizes of 100 µm to 1 mm size, microscopic features 304 with sizes 1 µm to 10 µm, and nanoscopic features 306 (below 1 µm) of the individual field emission devices. Each feature size provides a small incremental electric field enhancement. This is illustrated in FIG. 3A which shows the field gradient around the device (ranging from black for low fields, to white for high fields). It can be seen that as the additional features are added the field intensity gradually increases (compared the field region around macroscopic feature 302 to that around nanoscopic feature 306). The more features added, the less optimal the individual field emission devices are required to be, and/or a lower global voltage can be used to deliver the same performance because the individual devices are placed within an already enhanced electric field.

The multiple levels of field enhancement enable a broader range of field emission devices to contribute to the total electron current; however, the current contributed by each device will vary significantly due to the local field enhancement and Fermi levels of the individual devices. The current disclosure uses resistive pathways linking a common conductive substrate electrode with the individual devices to ensure even distribution of current (i.e. current sharing) across the entire emitter surface (emitting regions).

Figure 4:
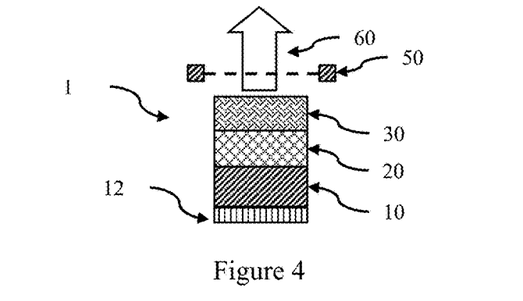
FIG. 4 is a schematic diagram of a field emission electron source device according to an embodiment.

FIG. 4 is a schematic diagram of a field emission electron source device 1 according to an embodiment and comprises a substrate 10, a current sharing matrix layer 20, and an emitter surface formed of a plurality of individual nanoscale field emitters 30. In this embodiment an electrode 12 is bonded to the base of the substrate 10 and an electric field extraction electrode 50 is located proximal to the surface field emission source device and in use the device emits electrons 60. In other embodiments the current sharing matrix layer 20 is embedded or formed in the electrode substrate 10. In some embodiments the entire substrate is also formed as the current sharing matrix layer 20 (i.e. the substrate 10 is the current sharing matrix layer 20). Similarly, in other embodiments the electrode 12 could be integrated with the substrate 10 (a substrate electrode) rather than bonded to the substrate 10. The current sharing matrix layer 20 comprises a plurality of series resistive pathways.

Figure 5:
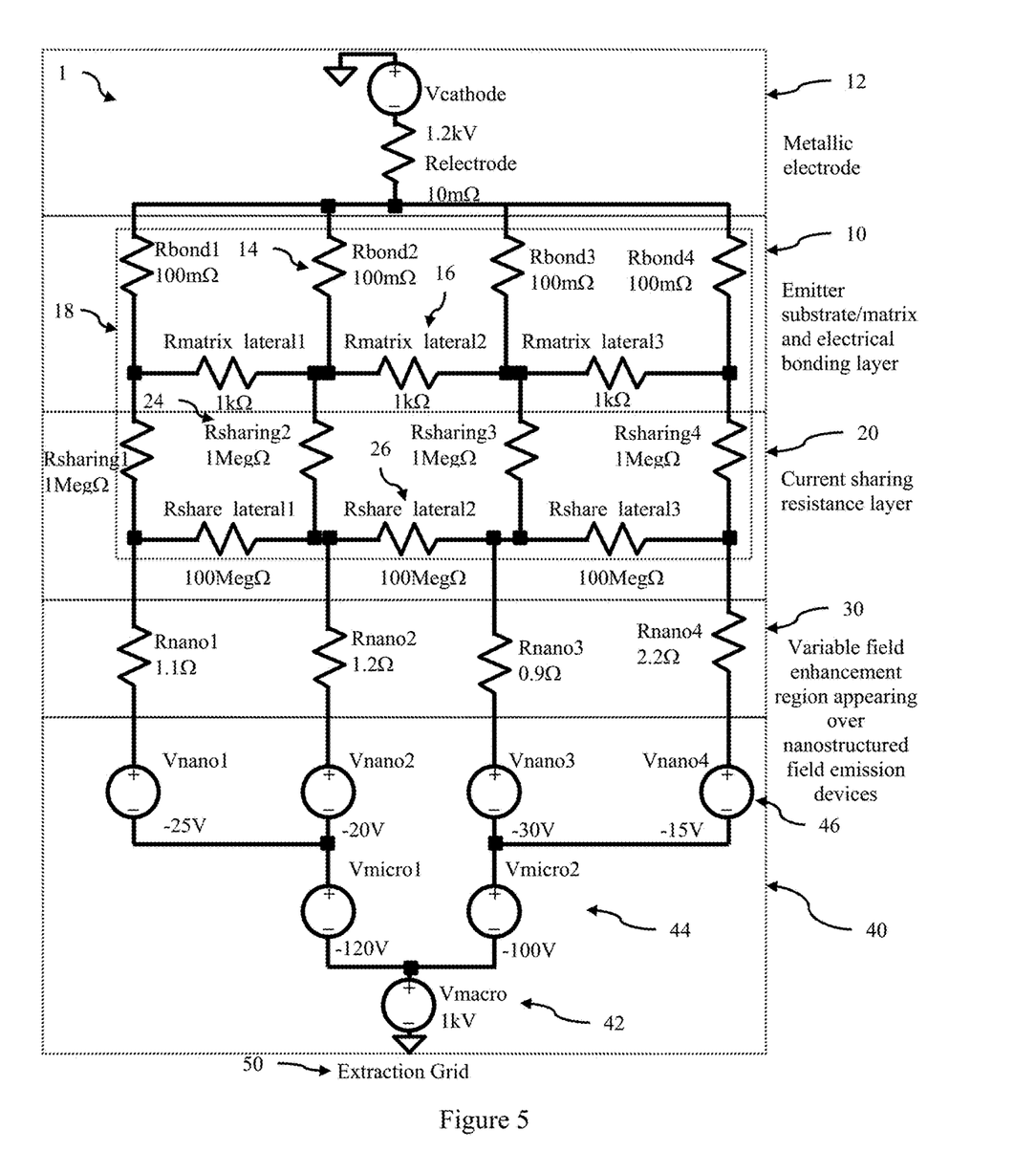
FIG. 5 is a schematic circuit diagram illustrating fractal field enhancement and distributed resistance according to an embodiment.

FIG. 5 is a schematic circuit diagram illustrating fractal field enhancement and distributed resistance and illustrates these resistive paths as a series of resistor dividers coupled to a tree of voltage sources. The tree of voltage sources is the multiple levels of field enhancement needed to initiate field emission, where the single global voltage differential between the individual nanoscopic field emission devices 30 and the secondary extraction electrode (extraction grid) 50 is successively broken down to series of voltage sources 42 (macro), 44 (micro), 46 (nano) just above the Fermi level of the distribution of devices. The distribution of devices and their electrical connection to the substrate electrode is a network of series resistors. When a source voltage is applied between the substrate electrode and the secondary extraction electrode that is greater than the Fermi level plus the field enhancement tree voltage, current will flow through the resistors and field emission devices. If the nanoscopic field emission devices have low resistance and were directly coupled to the substrate electrode, current will disproportionally flow to the devices with the lowest resistance. Adding a controlled voltage dividing network between the substrate electrode and the individual devices forces current to divide and spread more evenly to the individual devices.

In FIG. 5, the individual field emission devices 30 show a resistance of around 1.1Ω, this resistance is reflective of typical nanoscopic field emission devices and can be even lower for the best field emission devices (such as carbon nanotubes) which act as conductors. The conductive electrode 12 is shown as a 10 mΩ resistor connected to a voltage source that is greater than or equal to the overall field enhancement potential difference. The electrode is bonded to the substrate 10 and the current sharing matrix layer 20 is bonded to the substrate. The resistance of the substrate material 10 is shown as 100 mΩ resistors and promotes current flow through the substrate, as illustrated by the presence of 1 kΩ lateral resistors 16. The current sharing occurs due to the large resistors 24 in the middle of the resistor network (the current sharing matrix layer 20). These resistors 24 are much larger than any other in the paths between electrode 12 and the individual devices 30 and are shown as 1 MegΩ resistors. The structure of the material promotes current flow through the material, and this is illustrated by lateral resistors 26 with values of around 100 MegΩ. These large resistors 24 dominate the current flow and therefore enable even current sharing, despite the variation in the resistance of the individual field emission devices 30.

A highly resistive material is used to form current sharing matrix layer 20 and the resistive pathways illustrated in FIG. 5. This material may also bond the individual field emission devices to the electrode directly or be a layer within a more complex matrix that provides the electromechanical bonding. In some embodiments, the resistive pathways are formed using a highly resistive material. In some embodiments the resistive pathways are formed using a semiconductor material with resistive properties, or using a cermet material with resistive properties. Examples of material that can be used for this purpose include Silicon-dioxide mixed with Titanium oxide, Zinc Oxide, Manganese-Titanium oxide/nitride, Aluminium-nitride, or Boron-nitride; or a layer of doped Silicon. The multiple levels of field enhancement can be designed into the resistive material, so that the material forms both the macroscopic and microscopic field enhancement and the resistive pathways; the material can also be deposited on-top of an electrode that has the macroscopic and microscopic field enhancement features, so that the material only provides the resistive pathways; the material can also be deposited on-top of an electrode containing features and further features added into the material. In this embodiment the substrate 10 and current sharing matrix layer 20 are shown as separate layers, but in other embodiments they could be provided as an integrated layer 18. In these embodiments the substrate could be treated to form the current sharing matrix layer, or a doping gradient could be used to form a transition from a region of low resistance (i.e. substrate 10 in FIG. 2) to a region of high resistance (i.e. current sharing matrix or resistance layer 20).

The forced current sharing regulates the current passing through each individual field emission device. The intrinsic variability of the field emission devices results in a variability of current through the devices when operated without forced current sharing. When applied to a large area emitter, the variability of current will result in hot spots and cold spots occurring across the emitter. Forcing current sharing suppresses the occurrence of hot and cold spots where the field enhancement is sufficient to generate field emission. Combining an even distribution of field enhancement, using multiple levels of enhancement, with current sharing enables spatially even electron emission over a large region.

Figure 6:
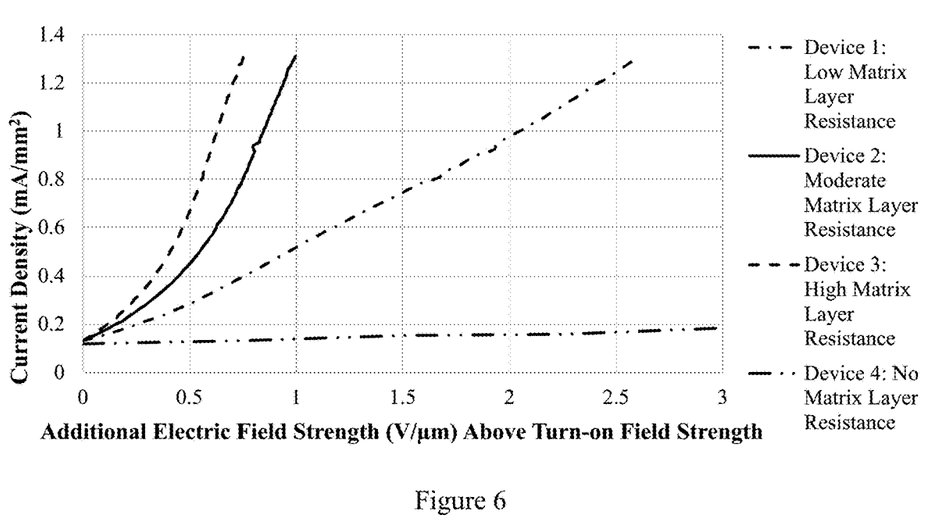
FIG. 6 is a plot of emission device performance of four field emission devices, all the same size, with different levels of resistance in the matrix layer of the device.

The advantage of forcing current sharing by increasing the resistance in the matrix layer of the emitter is demonstrated in FIG. 6. In FIG. 6, the emitter performance of four different large area devices is compared; each of the devices has the same emission area. Device 1 has lower resistance in the matrix. Device 2 has moderate resistance in the matrix layer, Device 3 has high resistance in the matrix layer, and Device 4 has no resistance in the matrix layer; therefore, Device 1 has limited forced current sharing, Device 2 has some forced current sharing. Device 3 has a large amount of forced current sharing, and Device 4 has no forced current sharing. The current density increases much more rapidly relative to field strength as the emitter matrix resistance increases; this relationship demonstrates that current sharing is forcing more individual field emitters to share in the total current drawn from the device as the current density is increased. In Device 4, the matrix acts as a nearly perfect conductor with no resistance and in this device only the field emission sources that turn on at the start of field emission provide electrons; as the electric field strength increases, only this subset of sources increases current and no other sources turn on as indicated by the very low slope in Device 4.

The method disclosed herein enables generation of stable electron emitters that have a long life. Field emission devices can rapidly degrade when the device is over-stressed and becomes chemically or thermally unstable. Ideal field emission devices have a high aspect ratio to decrease the Fermi level. However, this aspect ratio means that heat built up in the centre of the device must travel to the ends of the device to escape. The heat will travel to the active end; if the heat at the emission point becomes sufficiently high enough, the devices will begin to thermally emit electrons in addition to the quantum tunnelling of electrons. The thermally emitted electrons are sourced from the breakdown of the atomic bond structure of the device; as the device thermally emits it rips itself apart. The only way to prevent thermal emission of the field emission devices is to keep the current through the device below a safe limit for a given amount of emitter on-time. This safe limit will be unique to each individual device, but a general limit can be defined based on the general characteristics of the device (e.g. length, width, and atomic structure).

In the absence of designed current sharing, the nanostructured field emission devices will emit current proportionally to the nanoscopic field intensity each device sees. If one device has a lower turn on threshold than a neighbouring device, it will begin to emit current before its neighbour. As the electric field increases, the device with lower turn on threshold will continue to increase its current until it begins to thermally emit and degrade. Thermal emission is a slower process than field emission so when the thermally emitting devices reaches electrostatic equilibrium with its neighbours, it will continue to thermally emit until it cools down. Therefore, the device that started out emitting sooner than its neighbours could end up with higher turn on threshold due to the thermal degradation. This process will go back and forth between devices until the entire region has become degraded. The only way to prevent this from occurring, in the prior art, is to limit the current density of the entire emitter. Without current sharing, the derating of the average individual emitter operating current needs to be much harsher to allow for the wide spread of operating currents and is effectively determined by the emitter that has the strongest emission hitting the safe operating limit first. Engineering sharing resistance into the structure allows current extraction of individual emitters up to the safe operational limit to be more closely matched. This enables a broader range of devices to be used within the same structure which has advantages such as more repeatability, easier to scale to larger area, easier to manufacture, and longer life.

The method disclosed herein ensures stable current over a long life in two ways: first, current sharing lowers the risk of a set of field emission devices from beginning to thermally emit, and second, the multiple levels of field enhancement provides additional devices to take the place of devices that burn out early.

The current sharing evenly distributes the current between devices and accounts for the variation in the Fermi levels between individual devices. By sharing current between a large number of devices, the current stress on each individual device is reduced, and a higher overall emitter current density can be sustained without reducing the life of the emitter.

The multiple levels of field enhancement mean that a greater number of individual devices can be placed in the same region. The multiple levels shield the potentially degrading effect of having multiple devices close together and only the devices with the lowest Fermi voltage will turn on. If the on devices burn out, the global electric field can be increased. Increasing the global electric field turns on the previously inactive devices. By populating devices at multiple levels, the emitter has built-in levels of redundancy, extending the life of the emitter and retaining the same spatially even current.

Figure 7:
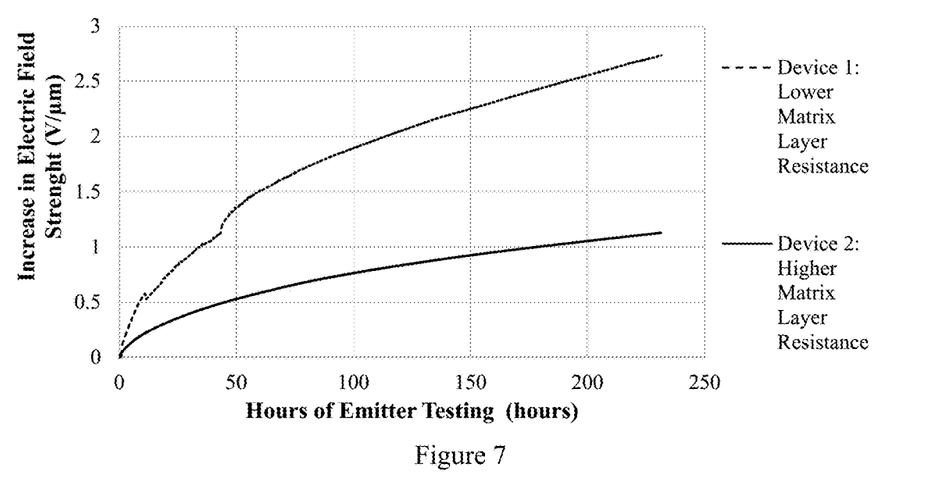
FIG. 7 is a plot of emission device lifetime testing of two field emission devices, both the same size and tested at the same current density, with different levels of resistance in the matrix layer of the device.

The advantage in device lifetime is demonstrated in FIG. 7, comparing two nearly identical devices, both the same size, same field emitters, same field enhancement features, but different levels of resistance in the matrix layer. The two emitters where tested at the same current density for an extended period to investigate the degradation of prolonged use on the field emission devices. Both devices show some performance degradation, as indicated by increased electric field strength required to deliver the same current density. However, Device 1 with lower matrix layer resistance, shows over double the absolute degradation and two and half times the rate of degradation as Device 2. The increased rate of degradation in Device 1 is due to the reduced current sharing in Device 1 compared to Device 2. The reduced current sharing means more current is being drawn from fewer field emitters and these field emitters are stressed and degrade faster.

As discussed previously the devices are manufactured or constructed in such a way to form a plurality of structures such that the structures form electric field enhancement features at a plurality of scales from a macroscopic scale down to the nanoscopic scale. Depending upon the method of construction the structures comprise one or more of fractal, geometrically repeating, and/or randomly distributed structures.

In one embodiment the plurality of structures comprises macroscopic scale structures having a size between 100 µm and 10 mm. The macroscopic features may be created by treating, forming, or constructing the current sharing matrix material, and/or the substrate. In one embodiment the features are shapes are repeating geometric shape patterns of field emission. These may be constructed by a deliberate design or manufacturing process that creates a structure and repeats this across the surface, or the structures may be created across the surface such as by masking and etching techniques, or other regular techniques such as photolithography.

In some embodiments the microscopic scale features are created through surface treatment of the current sharing matrix layer and/or substrate to create a three-dimensional surface of fractal or random structures in the few to tens of microns size. In some embodiments the microscopic scale features comprise matrix material and/or substrate formed to have a three-dimensional surface of fractal or random structures in the one to tens of microns size. In some embodiments the microscopic scale features are created or formed by patterning the placement of the plurality of individual nanoscale field emitters on the matrix material and substrate.

In some embodiment the nanoscopic features are either an inherent feature of the plurality of individual nanoscale field emitters or are created when bonding the plurality of individual nanoscale field emitters to the current sharing matrix material. In some embodiments the nanoscopic features are created by using nanostructured material of a fractal nature. In some embodiments the nanostructured material includes high aspect ratio features.

Suitable nanostructured materials may be formed from nanostructured carbon materials (i.e. carbon nanotubes, diamond, or vertical graphene), ceramics (e.g., metal or non-metal oxides such as alumina, silica, iron oxide, and copper oxide; metal or non-metal nitrides such as silicon nitride and titanium nitride; and metal or non-metal carbides such as silicon carbide; metal or non-metal borides such as titanium boride); metal or non-metal sulfides such as cadmium sulfide and zinc sulfide; metal silicides such as magnesium silicide, calcium silicide, and iron silicide; and semiconductor materials (e.g., diamond, germanium, selenium, arsenic, silicon, tellurium, gallium arsenide, gallium antimonide, gallium phosphide, aluminium antimonide, indium antimonide, indium tin oxide, zinc antimonide, indium phosphide, aluminium gallium arsenide, zinc telluride, and combinations thereof), tungsten nanowires, gold nanowires and other metallic nanowires.

Figure 3B:
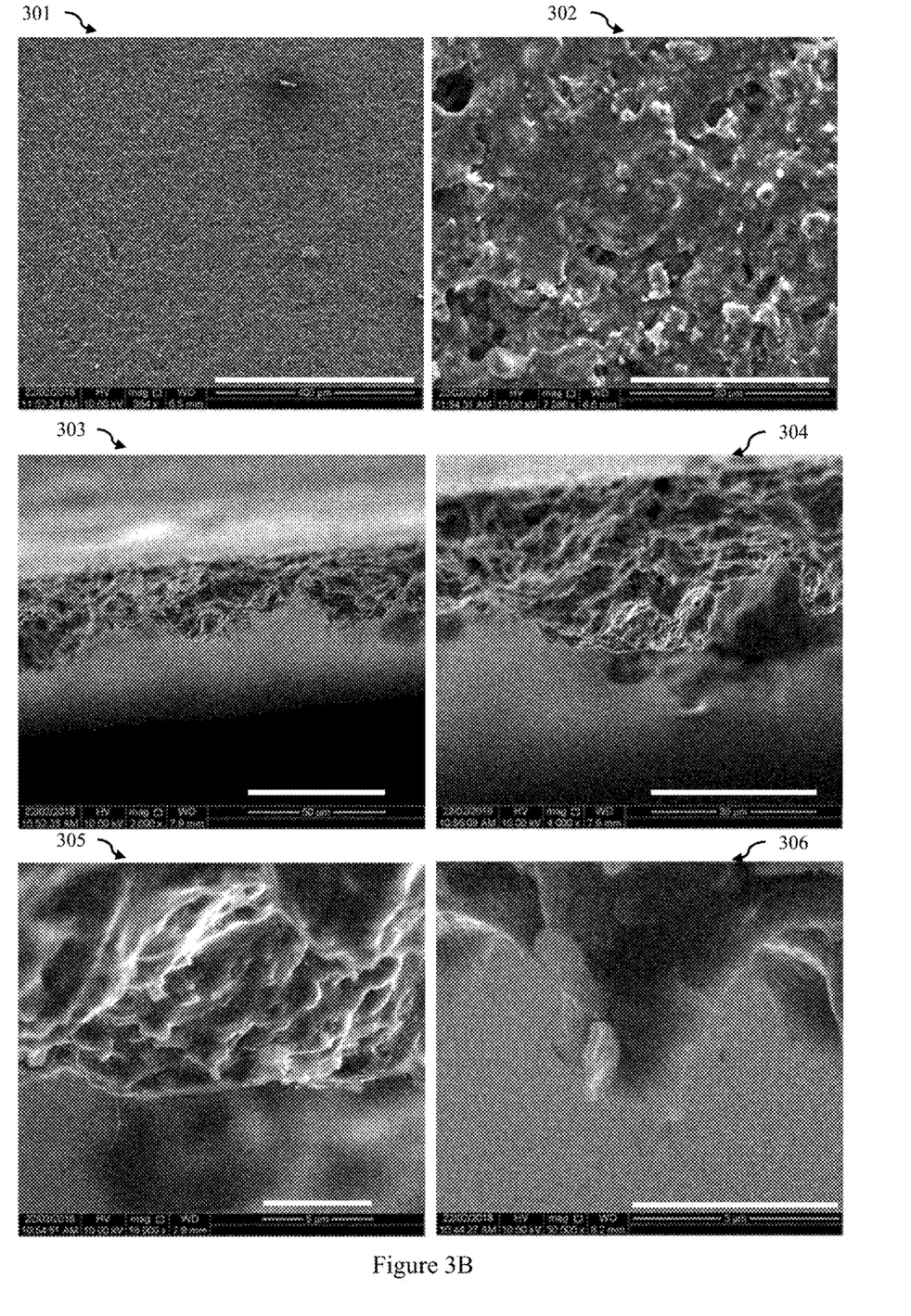
FIG. 3B is a series of photographs of the surface of a field emission device according to an embodiment taking at different scales.
Figure 3C:
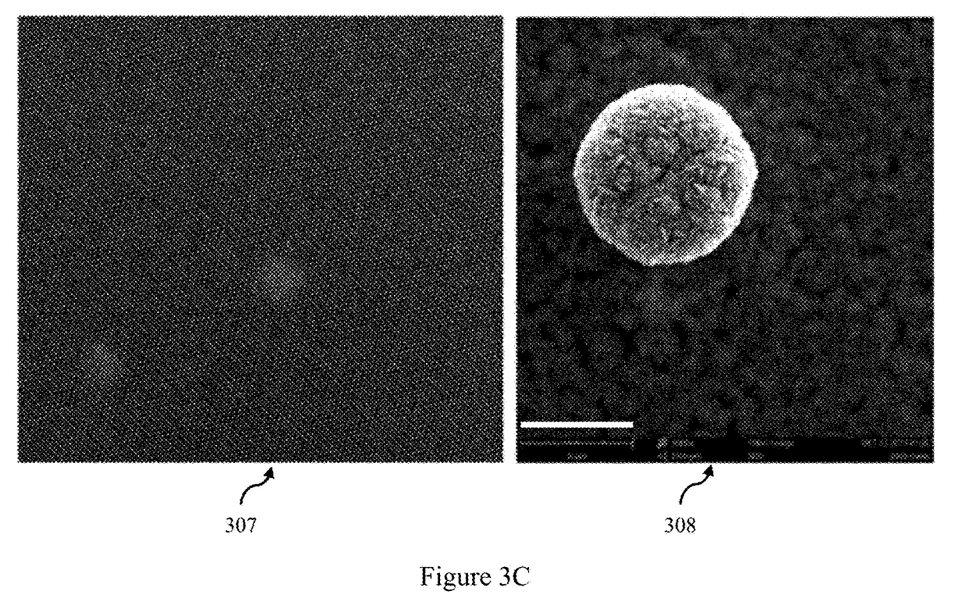
FIG. 3C is a of photograph of the surface of another field emission device according to an embodiment taking at different scales.

The presence of features from a range of scales from the macroscopic to nanoscopic scale is further illustrated in FIGS. 3B and 3C which shows a series of scanning electron microscope (SEM) images of the surface of a field emission device constructed according to the method described herein.

In FIG. 3B, image 311 shows a comparatively low-resolution image at 384 times resolution with a white line indicating a 400 micron scale, Image 313 is a 2000 times resolution image with the white line indicating a 50 micron scale. Image 314 is a 4000 times resolution image with the white line indicating a 30 micron scale. Image 312 is a 7269 times resolution image with the white line indicating a 20 micron scale. Image 315 is a 16000 times resolution image with the white line indicating a 5 micron scale. Image 316 is a 50000 times resolution image with the white line indicating a 3 micron scale showing carbon nanotubes atop an inverted peak (matrix sharing layer) structure. These images illustrate the range of structures forming the surface of the device over a range of scales. In this embodiment the matrix sharing material has resistive properties to force current sharing across a 100 mm$^2$ surface to tens of thousands individual carbon nanotube field emitters.

In FIG. 3C, image 317 shows a comparatively low-resolution image of a patterned devices where the macroscopic and microscopic features are formed as a uniform repeating pattern instead of a fractal random pattern. Image 318 is a 9000 times resolution image with the white line indicating an 8 micron scale. Image 318 shows a high-resolution image of a single macroscopic to microscopic feature on the patterned device; the feature shown in 318 is covered with randomly distributed nanostructured field enhancement features. In this embodiment the macroscopic and microscopic features are silicon pillars covered with diamond field emitters.

Figure 8:
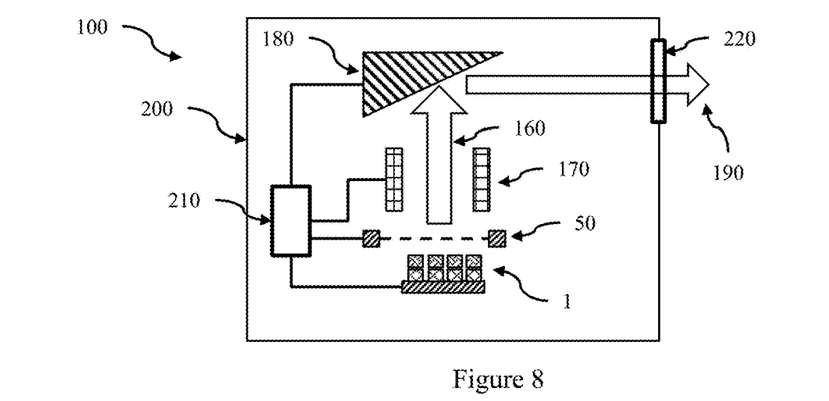
FIG. 8 is a schematic diagram of an X-Ray field emission device incorporating field emission devices shown in FIG. 4 according to an embodiment.

Large scale stable field emitters as described herein can be used in a range of devices and systems. One application is X-Ray field emission device 100 as illustrated in FIG. 8. This device comprises a cathode comprising one or more field emission electron source devices 1 as described herein, an electric field extraction electrode 50 and control electronics 210 for switching the one or more field emission electron source devices on and off. A focusing electrode 170 may also be used to focus the electron beam 160. An anode 180 comprising a target material configured to generate X-Ray emissions 190 when impacted by electrons 160 generated by the one or more field emission electron source devices 1 is located in a vacuum chamber 200 comprising a window 220 for allowing passage of the X-rays generated from the anode.

Large scale stable field emitters for high current applications and methods of manufacture have been described herein. Embodiments of these devices may have emission regions of at least one square millimeter are able to deliver stable electron emission with a current density greater or equal to one milliampere per square millimeter. The design principles and methods for manufacturing large area electron emitter to deliver larger, stable, even current based on nanostructured field emission devices have been described herein. Embodiments of the methods described address the intrinsic variability in nanostructured field emission devices and describe design criteria and properties required to deliver an even current for many inherently unique nanostructured field emission devices. Embodiments of the methods described herein enable a wider range of emitters to be manufactured and enable a scalable process for generating larger devices.

The invention claimed is:

1. A method for manufacturing a field emission electron source device comprising:
    forming a current sharing matrix layer electrically connected to a substrate, wherein the current sharing matrix is either bonded to the substrate, deposited on the substrate, formed directly on the substrate, or formed directly in the substrate; and
    forming an emitter surface comprised of a plurality of nanoscale field emitters electrically connected to the matrix sharing layer, wherein the emitter surface is formed by either obtaining a plurality of nanoscale field emitters and bonding to the current sharing matrix layer or forming the plurality of nanoscale field emitters directly on the current sharing matrix layer,
    wherein
    the current sharing matrix incorporates a plurality of series resistive pathways between the plurality of individual nanoscale field emitters and the substrate to force current sharing among the plurality of individual nanoscale field emitters,
    such that in use, the field emission electron source device emits electrons with a spatially even distribution across an emitter region of the emitter surface having an area of at least one square millimeter and at a current density greater or equal to one milliampere per square millimeter.

2. The method as claimed in claim 1, wherein the resistive pathways are formed using a highly resistive material.

3. The method as claimed in claim 1, wherein the resistive pathways are formed using a semiconductor material with resistive properties.

4. The method as claimed in claim 1, wherein the resistive pathways are formed using a cermet material with resistive properties.

5. The method as claimed in claim 1, wherein the substrate is an electrode substrate and the method further comprises forming an electrical connection to the electrode substrate.

6. The method as claimed in claim 1, wherein the method further comprises bonding an electrode to the substrate and forming an electrical connection to the electrode.

7. A field emission electron source device comprising:
an electrode integrated into a substrate or an electrode bonded to a substrate;
an emitter surface comprised of a plurality of individual nanoscale field emitters; and
a current sharing matrix layer matrix material located between the plurality of individual nanoscale field emitters and the substrate or incorporated into the substrate;
wherein
the current sharing matrix layer comprises a plurality of series resistive pathways between the plurality of individual nanoscale field emitters and the electrode to force current sharing among the plurality of individual nanoscale field emitters, and
in use, the field emission electron source device emits electrons with a spatially even distribution across an emitter region of the emitter surface having an area of at least one square millimeter and delivers stable electron emission with a current density greater or equal to one milliampere per square millimeter.

8. The field emission electron source device as claimed in claim 7, wherein the current sharing matrix layer is formed of a matrix material electromechanically bonded to the plurality of individual nanoscale field emitters.

9. The field emission electron source device as claimed in claim 7, wherein the current sharing matrix layer is formed of a matrix material electromechanically bonded to the substrate electrode.

10. The field emission electron source device as claimed in claim 7, wherein the current sharing matrix layer is formed within the substrate and is bonded to the electrode.

11. The field emission electron source device as claimed in claim 7, wherein the resistive pathways are formed using a semiconductor material with resistive properties.

12. The field emission electron source device as claimed in claim 7, wherein the resistive pathways are formed using a cermet material with resistive properties.

13. The field emission electron source device as claimed in claim 7 further comprising a secondary electric field extraction electrode and control electronics for switching field emission on and off.

14. An X-Ray field emission device comprising:
a cathode comprising one or more field emission electron source devices wherein each of the one or more field emission electron source devices comprises:
an electrode integrated into a substrate or an electrode bonded to a substrate;
an emitter surface comprised of a plurality of individual nanoscale field emitters; and
a current sharing matrix layer matrix material located between the plurality of individual nanoscale field emitters and the substrate or incorporated into the substrate;
wherein
the current sharing matrix layer comprises a plurality of series resistive pathways between the plurality of individual nanoscale field emitters and the electrode to force current sharing among the plurality of individual nanoscale field emitters, and
in use, the field emission electron source device emits electrons with a spatially even distribution across an emitter region of the emitter surface having an area of at least one square millimeter and delivers stable electron emission with a current density greater or equal to one milliampere per square millimeter;
an electric field extraction electrode;
control electronics for switching the field emission one or more field emission electron source devices on and off;
an anode comprising a target material configured to generate X-Ray emissions when impacted by electrons generated by the one or more field emission electron source devices; and
a vacuum chamber comprising a window for allowing passage of the X-rays generated from the anode.

15. The X-Ray field emission device as claimed in claim 14, wherein the current sharing matrix layer is formed of a matrix material electromechanically bonded to the plurality of individual nanoscale field emitters.

16. The X-Ray field emission device as claimed in claim 14, wherein the current sharing matrix layer is formed of a matrix material electromechanically bonded to the substrate electrode.

17. The X-Ray field emission device as claimed in claim 14, wherein the current sharing matrix layer is formed within the substrate and is bonded to the electrode.

18. The X-Ray field emission device as claimed in claim 14, wherein the resistive pathways are formed using a semiconductor material with resistive properties.

19. The X-Ray field emission device as claimed in claim 14, wherein the resistive pathways are formed using a cermet material with resistive properties.

20. The X-Ray field emission device as claimed in claim 14 further comprising a secondary electric field extraction electrode and control electronics for switching field emission on and off.

* * * * *